(12) United States Patent
Gass et al.

(10) Patent No.: US 9,315,977 B1
(45) Date of Patent: Apr. 19, 2016

(54) VALVE APPARATUS FOR REGULATING FLUIDS THROUGH A PIPE

(71) Applicants: Charles Robert Gass, Imlay City, MI (US); Daniel A. Handley, Genoa City, WI (US)

(72) Inventors: Charles Robert Gass, Imlay City, MI (US); Daniel A. Handley, Genoa City, WI (US)

(73) Assignee: Joelex, Inc., Chicago, IL (US)

( * ) Notice: Subject to any disclaimer, the term of this patent is extended or adjusted under 35 U.S.C. 154(b) by 0 days.

(21) Appl. No.: 14/336,470

(22) Filed: Jul. 21, 2014

Related U.S. Application Data

(63) Continuation-in-part of application No. 13/735,685, filed on Jan. 7, 2013.

(51) Int. Cl.
| | |
|---|---|
| *E03C 1/10* | (2006.01) |
| *F16K 15/06* | (2006.01) |
| *G01F 15/18* | (2006.01) |
| *G01F 15/00* | (2006.01) |
| *E03B 7/07* | (2006.01) |
| *F16K 15/02* | (2006.01) |

(52) U.S. Cl.
CPC ............... *E03C 1/106* (2013.01); *E03B 7/077* (2013.01); *E03C 1/104* (2013.01); *F16K 15/026* (2013.01); *F16K 15/063* (2013.01); *G01F 15/005* (2013.01); *G01F 15/18* (2013.01)

(58) Field of Classification Search
CPC ..... F16K 15/02; F16K 15/021; F16K 15/025; F16K 15/026; F16K 15/06; F16K 15/063; F16K 15/066; E03C 1/106; E03C 1/104; G01F 15/005; Y10T 137/7922
USPC ...................... 137/540, 542, 543.15
See application file for complete search history.

(56) References Cited

U.S. PATENT DOCUMENTS

| | | | | | |
|---|---|---|---|---|---|
| 1,785,271 | A | * | 12/1930 | Lemex | 137/515.5 |
| 2,744,727 | A | * | 5/1956 | Osburn | 137/454.2 |
| 4,747,426 | A | * | 5/1988 | Weevers | 137/220 |
| 5,036,882 | A | * | 8/1991 | Norcross et al. | 137/543.23 |
| 5,080,122 | A | * | 1/1992 | Neuzeret | 137/15.18 |
| 6,443,183 | B1 | * | 9/2002 | Roorda | 137/529 |
| 8,230,875 | B2 | * | 7/2012 | Norman | 137/315.33 |

* cited by examiner

*Primary Examiner* — Kevin Lee
(74) *Attorney, Agent, or Firm* — Scherrer Patent & Trademark Law, P.C.; Stephen T. Scherrer; Monique A. Morneault

(57) ABSTRACT

Apparatuses manage the flow of fluids, such as, for example, water, through pipes. Specifically, the apparatuses of the present invention create a backward pressure in fluid traversing the pipe, wherein the backward pressure within the pipe provides compression of the fluid effectively compressing entrapped gas bubbles within the fluid, allowing more accurate water meter measurements. The apparatuses comprise spring seats for holding springs therein in alignment, and further comprise conically-tapered apertures for providing improved water flow through the apparatuses. Moreover, the apparatuses of the present invention provide backflow prevention. Systems and methods for managing fluids are further provided.

11 Claims, 8 Drawing Sheets

VALVE APPARATUS FOR REGULATING FLUIDS THROUGH A PIPE

The present invention claims priority to U.S. Non-provisional patent application Ser. No. 13/735,685 entitled, "Apparatus, Systems and Methods for Managing Fluids", having a filing date of Jan. 7, 2013, which is hereby incorporated by reference in its entirety.

TECHNICAL FIELD

The present invention relates to apparatuses for managing the flow of fluids, such as, for example, water, through pipes. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatuses of the present invention provide backflow prevention. Systems and methods for managing fluids are further provided.

BACKGROUND

It is, of course, generally known to utilize pipes for transporting fluids, such as water, from one location to another. In modern times, users generally pay for the amount of water that flows into their homes or other buildings based on the volume of usage over a specific timeframe. Businesses, especially, can be saddled with high costs for water, especially when a large amount of water is necessary for industrial processes. Specifically, the more water a home or other building has flowing thereinto, the higher the cost to the user of the water.

However, water meters that measure the flow of water into a home or other building do so by reading the volume of fluid that passes through the water meter. Typically, water meters have a fan-like turbine apparatus that spins as the fluid flows therethrough. The rotation of the turbine apparatus directly correlates to the measurement of the volume of water through the water meter.

Importantly, since the water meter measures the volume of the fluid flowing therethrough, any additional component or material within the water may be falsely registered as water when, in fact, it is not. For example, entrapped gas bubbles, such as air, may accumulate within water pipes before the water reaches the water meter. The gas bubbles may artificially increase the volume flowing into the water meter, causing a false reading, since a water meter typically cannot distinguish between the volume of water and the volume of air. In other words, gas bubbles, such as air, entrapped within water flowing through pipes, may cause a water meter to register a higher volume of water than in actuality.

A need, therefore, exists for apparatus, systems and methods for decreasing or removing the effect of entrapped bubbles within fluid, such as water, within a pipe. Further, a need exists for apparatus, systems and methods for providing a volume of fluid through a pipe that is more closely representative of the actual volume of the fluid within the pipe.

Specifically, a need exists for apparatus, systems and methods for removing the effect of entrapped gas bubbles within a fluid as the fluid flows through a meter, so that the meter may provide a more accurate reading of the volume of fluid flowing therethrough. In addition, a need exists for apparatus, systems and methods for effectively reducing the cost of water flowing into a home or other building.

Moreover, it is also generally known that water flowing into a home or other building may have periods of backflow, which may interfere with the quality of water that may flow into the home or other building. Specifically, while water may generally move in one direction during times of normal usage, certain occurrences of backflow may cause fouled water, contaminated water, or other fluids, to backflow, thereby fouling or otherwise contaminating the pipes and/or the source of the water.

Indeed, a flood within a home caused by extreme weather or other reasons may cause fouled water to flow the opposite direction within pipes. Moreover, it is feared that a terrorist may attempt to foul or otherwise contaminate fresh water by injecting or otherwise forcing an amount of a contaminated material, such as pathogenic, nuclear or other contamination, back through pipes from a water distribution node, such as a home or the like, into a water source. Backflow preventers are generally known that utilize a valve, such as a poppet or check valve to close when reverse pressure from backflow of fluids occurs. This may generally protect the pipes and/or the source of water from back flow conditions, caused by natural or unnatural conditions.

For example, U.S. Pat. Nos. 1,828,697 and 1,860,004, both to Yardley, disclose a check valve having a floating guide to allow the passage of fluids therethrough, but to prevent the backflow of fluids due to the valve body sitting on valve seat. However, neither of the Yardley patents recognizes the benefits of compressing gas within water or other fluid to provide a more accurate measurement of the flow of water therein in the manner presented herein, or providing a dual-chamber valve apparatus as disclosed in the present invention for backflow prevention.

In addition, U.S. Pat. App. Pub. No. 2012/0118406 to Edgeworth discloses apparatuses and systems to increase the efficiency of a water meter. However, Edgeworth suffers from lack of connectivity to pipes and other apparatuses, and use of an apparatus as described in Edgeworth will lead to failure of the apparatus as it is being used, as the springs are not guided to maintain their positions within the apparatus. Moreover, there is no recognition in Edgeworth to the benefits of a dual chamber apparatus.

However, although backflow preventers within pipes may be required in certain circumstances, backflow prevention is not a requirement in many homes. Thus, many homes or other buildings do not have this important safety feature.

A need, therefore, exists for improved apparatuses to increase the efficiency of water meters to read a true measurement of a flow of water therethrough. A need further exists for improved apparatuses that are resilient to failure during periods of long use, and can be relied upon.

In addition, a need exists for apparatus, systems and methods that may be utilized as a backflow prevention device within a pipe, such as within a water pipe utilized to distribute fresh and clean water to a home or other building. Moreover, a need exists for apparatus, systems and methods that encourage homeowners or other building owners to install backflow preventers within their pipes to protect their pipes and sources of water.

A need further exists for apparatus, systems and methods that provide the dual purpose of more accurately measuring the flow of water within pipes as well as providing backflow prevention in the event of backflow.

SUMMARY OF THE INVENTION

The present invention relates to an apparatus for managing the flow of fluids, such as, for example, water, through pipes.

Specifically and without being bound by theory, the apparatus of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatus of the present invention provides backflow prevention. Systems and methods for managing fluids are further provided.

To this end, in an embodiment of the present invention, an apparatus for managing the flow of fluid through a pipe is provided. The apparatus comprises a housing forming an internal chamber having an inlet opening and an outlet opening wherein pressurized fluid flows through the housing, a poppet valve mounted to a shaft and disposed within the internal chamber, the poppet valve able to contact a seat in proximity to the inlet opening wherein contacting the seat seals the chamber and prevents the flow of fluid through the housing, a base in proximity to the outlet opening, the base having a central opening slidably receiving the shaft, an internal surface, and at least one aperture for allowing the flow of fluid therethrough, wherein the at least one aperture is tapered, and a spring around the shaft having a first end and a second end, the first end of the spring disposed within a first portion in the poppet valve and the second end of the spring disposed within a second portion in the internal surface of the base, wherein movement of the poppet valve toward the base causes a compression of the spring.

In an embodiment, the at least one aperture is tapered in a middle of the at least one aperture, such that a funneled inlet and a funneled outlet are formed.

In an embodiment, the funneled inlet is angled at 22 degrees and the funneled outlet is angled at 14 degrees.

In an embodiment, the first portion in the poppet valve and the second portion in the base hold the spring in alignment around the shaft.

In an embodiment, the shaft is rigidly disposed within the poppet valve.

In an embodiment, the shaft has a threaded end, wherein the threaded end is disposed within the poppet valve without traversing the entirety of the poppet valve.

In an embodiment, the apparatus further comprises a mounting plate disposed on a first end of the housing in proximity to the inlet opening for mounting the apparatus within a pipe.

In an embodiment, the apparatus further comprises a threaded portion disposed at a first end of the housing in proximity to the inlet opening.

In an embodiment, the apparatus further comprises a threaded portion disposed at a second end of the housing in proximity to the outlet opening.

In an embodiment, the housing has a body portion, the body portion hexagonal in cross section.

In an embodiment, the apparatus further comprises a second housing forming a second internal chamber having an inlet opening and an outlet opening wherein pressurized fluid flows through the second housing, a second poppet valve mounted to a second shaft and disposed within the second internal chamber, the poppet valve able to contact a seat in proximity to the inlet opening of the second internal chamber wherein contacting the seat seals the second internal chamber and prevents the flow of fluid through the second housing, a second base in proximity to the second outlet opening, the second base having a central opening slidably receiving the second shaft, an internal surface, and at least one aperture for allowing the flow of fluid therethrough wherein the at least one aperture is tapered, and a second spring around the second shaft having a first end and a second end, the first end of the second spring disposed within a first portion in the poppet valve and the second end of the spring disposed within a second portion in the internal surface of the base, wherein movement of the second poppet valve toward the second base causes a compression of the second spring.

In an embodiment, the first housing and the second housing are disposed serially.

In an embodiment, the first spring is a coil spring.

In an embodiment, the second spring is a wave spring.

In an embodiment, the first spring is a coil spring and the second spring is a wave spring.

In an embodiment, the first portion in the poppet valve and the second portion in the base hold the second spring in alignment around the second shaft.

In an embodiment, the at least one aperture is tapered in a middle of the at least one aperture, such that a funneled inlet and a funneled outlet are formed.

In an embodiment, the funneled inlet is angled at 22 degrees and the funneled outlet is angled at 14 degrees.

In an embodiment, the second housing has a body portion that is hexagonal in cross-section.

In an embodiment, the first housing has a threaded end and is disposed within a threaded end of the second housing thereby attaching the first housing to the second housing.

It is, therefore, an objective and advantage of the present invention to provide improved apparatuses, systems and methods to increase the efficiency of water meters to read a true measurement of a flow of water therethrough.

It is an a further objective and advantage of the present invention to provide improved apparatuses, systems and methods that are resilient to failure during periods of long use, and can be relied upon.

It is also an objective and advantage of the present invention to provide apparatuses, systems and methods for decreasing or removing the effect of entrapped bubbles within fluid, such as water, within a pipe.

Further, it is an objective and advantage of the present invention to provide apparatuses, systems and methods for providing a volume of fluid through a pipe that is more closely representative of the actual volume of the fluid within the pipe.

Specifically, it is an objective and advantage of the present invention to provide apparatuses, systems and methods for removing the effect of entrapped gas bubbles within a fluid as the fluid flows through a meter, so that the meter may provide a more accurate reading of the volume of fluid flowing therethrough.

In addition, it is an advantage and objective of the present invention to provide apparatuses, systems and methods for effectively reducing the cost of water flowing into a home or other building.

Moreover, it is an objective and advantage of the present invention to provide apparatuses, systems and methods that may be utilized as a backflow prevention device within a pipe, such as within a water pipe utilized to distribute fresh and clean water to a home or other building.

Moreover, it is an advantage and objective to provide apparatus, systems and methods that encourage homeowners or other building owners to install backflow preventers within their pipes to protect their pipes and sources of water.

It is a further advantage and objective of the present invention to provide apparatuses, systems and methods that provide the dual purpose of more accurately measuring the flow of water within pipes as well as providing backflow prevention in the event of backflow.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an apparatus for managing the flow of fluids, such as, for example, water, through pipes. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatus of the present invention provides backflow prevention. Systems and methods for managing fluids are further provided.

Figure 1:
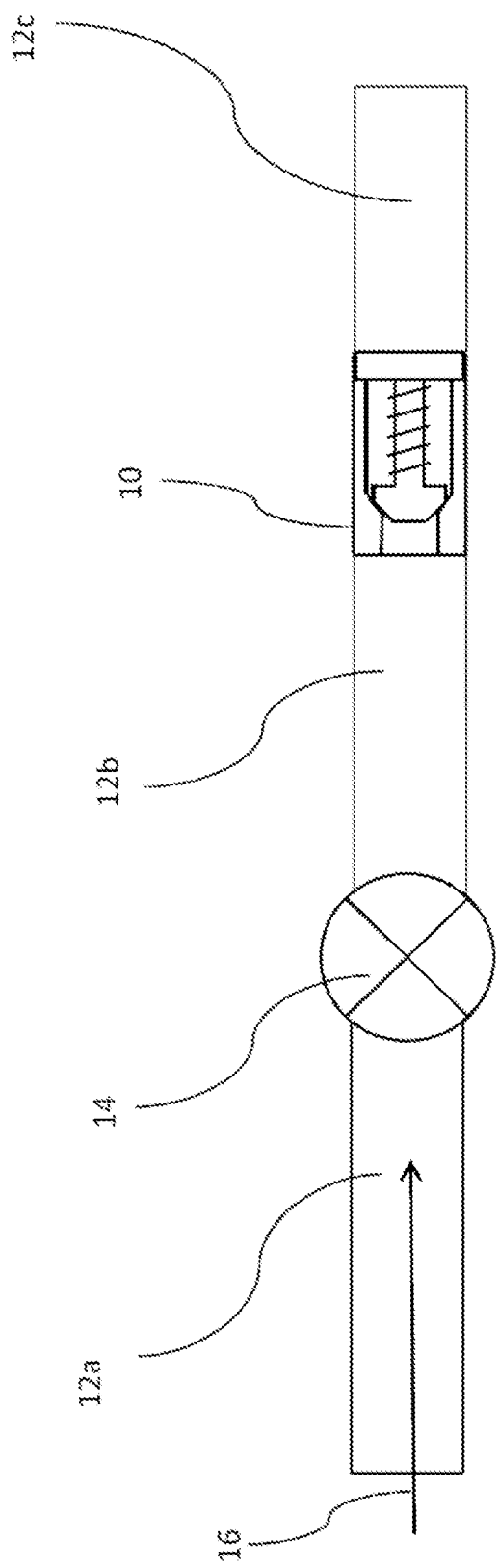
FIG. 1 illustrates a representative of an apparatus of the present invention in-line within a pipe in position to affect the measured volume of water flowing through a water meter in an embodiment of the present invention.

Referring now to the figures, wherein like numerals refer to like parts, FIG. 1 illustrates a representation of an apparatus 10 in an embodiment of the present invention. The apparatus 10 may be disposed in-line with a pipe, represented by pipe sections 12a, 12b, 12c that may provide a flow of a fluid therethrough. The fluid may flow, generally, from left to right in FIG. 1, as represented by the arrow 16. In a preferred embodiment, the fluid may be water, and the pipe sections 12a, 12b, 12c may be parts of a water distribution pipe allowing the flow of fresh and clean water into a home or another building, as apparent to one of ordinary skill in the art. For purposes of the present invention, the fluid will be described as being water. It should be noted, however, that the apparatus 10 of the present invention may be utilized for impacting the flow of other fluids and should not be limited as described herein.

Also in-line with the pipe may be a water meter 14 for measuring the volume of water flowing therethrough. Thus, given a certain period of time, a total volume of water may be determined based on the rate of flow of water volume through the water meter 14. The water meter may be any water meter apparent to one of ordinary skill in the art, and the specific type of water meter is unimportant for purposes of the present invention. It is typical for water flowing within pipes, especially from a source, to contain an amount of air bubbles or other gas entrapped within the water. Gas bubbles within the water flowing through the water meter 14 may cause a falsely higher measurement of water volume flowing therethrough, leading to an inaccurate report. An inaccurate report of the volume of water flowing through the water meter 14 may cause an artificially increased cost of water consumption.

While not being bound by theory, water flowing through the pipe of the present invention may be compressed by having an amount of backward pressure induced on the fluid by the apparatus 10. Specifically, the valve contained within the apparatus 10, as shown in more detail below with respect to FIG. 3, may induce a back pressure on the water upstream from the apparatus 10, thereby compressing the air bubbles in the water upstream from the apparatus 10. The compression of the water compresses the air bubbles within the water to take up a small volume of space in the vicinity immediately upstream from the apparatus 10. Specifically, the compression of the air bubbles may be maintained for approximately five to ten feet upstream from the apparatus 10. Thus, positioning the apparatus downstream but within proximity of the water meter 14 may allow the water meter to measure a truer and more accurate volume of water flowing within the pipe. Thus, it is preferred that the apparatus 10 of the present invention be positioned within three to ten feet downstream of the water meter 14, more preferably four feet to seven feet downstream of the water meter 14, although the present invention should not be limited as described herein.

In operation, a poppet valve (detailed below) within apparatus 10 oscillates as pressure builds within the pipe 12b, caused by the apparatus 10 pushing back against the flow of water therethrough. The oscillation of the poppet valve causes the compression of gas within the fluid upstream of the apparatus 10, causing a truer reading of the fluid flow through the water mater 14.

Figure 2:
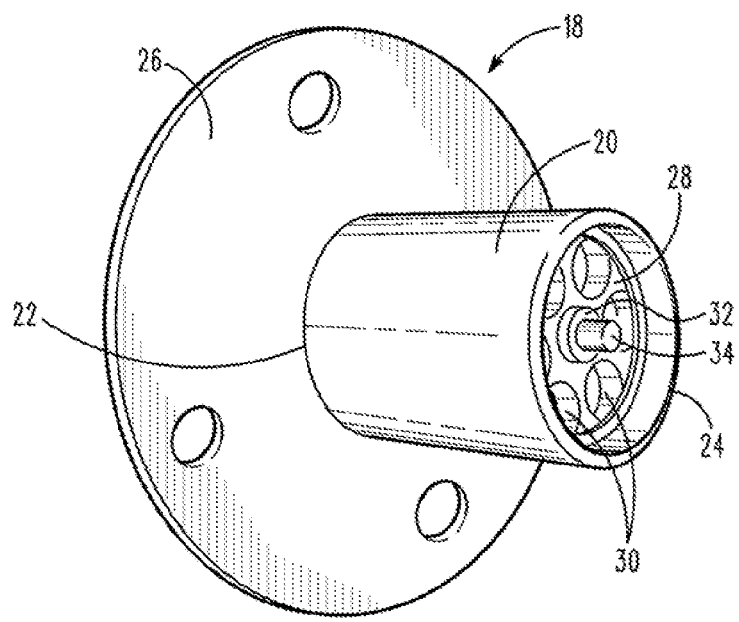
FIG. 2 illustrates a perspective view of an apparatus in an embodiment of the present invention.
Figure 4:
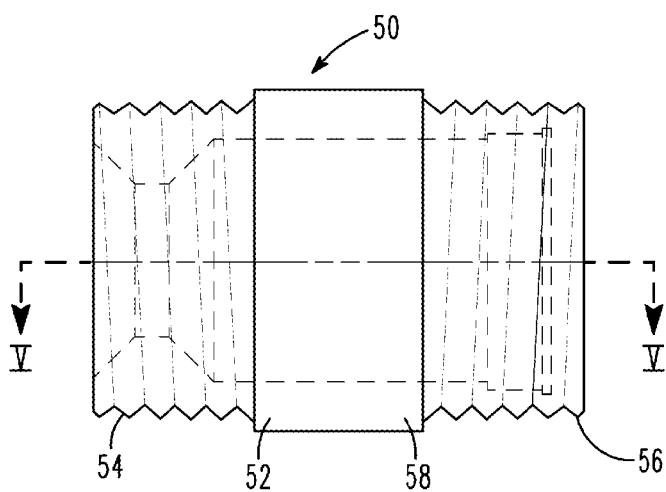
FIG. 4 illustrates a plan view of an apparatus in an alternate embodiment of the present invention.
Figure 5:
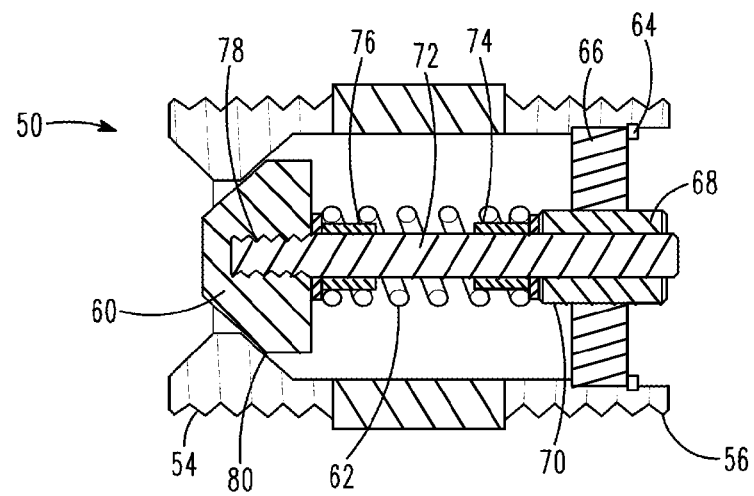
FIG. 5 illustrates a cross-sectional view of an apparatus in the alternate embodiment of the present invention.
Figure 6:
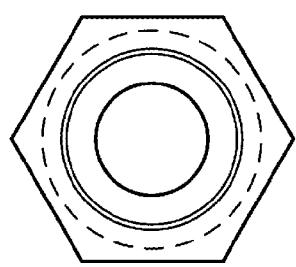
FIG. 6 illustrates a side view of the apparatus in the alternate embodiment of the present invention.

FIG. 2 illustrates a perspective view of the apparatus 10 in an embodiment of the present invention. The apparatus 10 may include a cylinder portion 20, having a first end 22 and a second end 24 through which water flows therethrough. On the first end 22 may be a pipe fitting mounting plate 26, allowing the apparatus 10 to be fit on a relatively large diameter pipe. In other embodiments, the pipe fitting mounting plate may not be present and the apparatus 10 may simply be directly fit onto threads of a pipe, as illustrated in FIGS. 4-6 and described in more detail below.

Within the second end 24 of the apparatus 10 may be a base 28 that may be rigidly held in place, having a plurality of apertures 30 disposed therein to allow water to freely flow through the apertures 30. The base may include a reinforcement ring 32 at the center of the base 28 with an aperture therein to allow the movement of a shaft 34 therethrough. The shaft 34 may be connected to the poppet valve, as described below, and may oscillate with the poppet valve freely through the aperture within the reinforcement ring 32.

Figure 3:
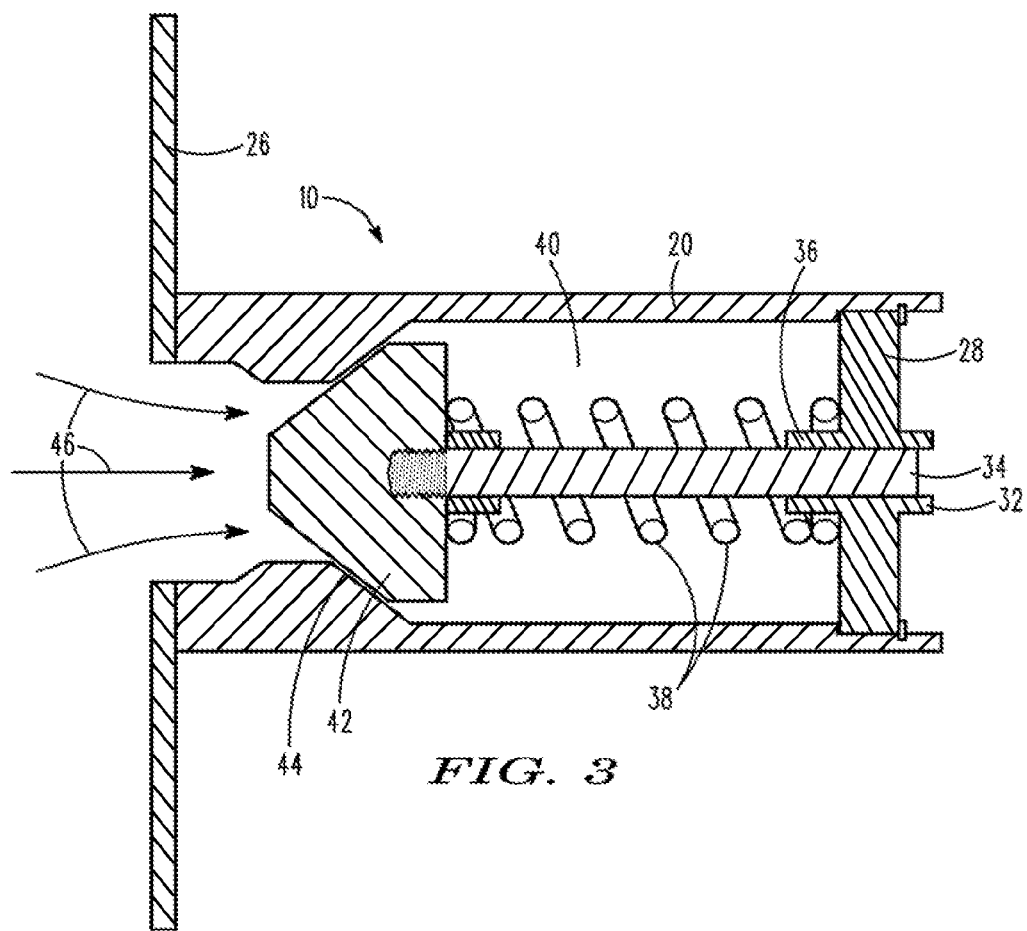
FIG. 3 illustrates a cross-sectional view of an apparatus in an embodiment of the present invention.

FIG. 3 illustrates a cross-sectional view of the apparatus 10 in an embodiment of the present invention, showing the cylinder portion 20, the pipe fitting mounting plate 26, and the base 28 having the reinforcement ring 32 having the aperture for the shaft 34 to freely move therethrough. The base 40 may further have an internal spring guide ring 36 that allows a spring 38 to maintain its position within an internal chamber 40 of the cylinder portion 20. The spring 38 may contact, at one end thereof, an internal surface of the base 40, maintaining its position within the chamber 40 via the spring guide ring 36. Moreover, the spring 38 may contact, at a second end thereof, an internal surface of a poppet valve 42, thereby pushing the poppet valve 42 into a seat 44 of the cylinder portion 20. The shaft 34 may be interconnected to the poppet valve 42, providing a linear path of movement of the poppet valve 42 against and away from the seat 44 of the cylinder portion 20. Preferably, the poppet valve 42 is frusto-conically shaped and may sit on the seat that may also have a frusto-conical shape to receive the same.

In operation, water or another fluid, represented by arrows 46 in FIG. 3, push against the external surface of poppet valve 42 against the tension of the spring 38, which is pushing the poppet valve 42 in the opposite direction. The resistance of the poppet valve 42, caused by the spring 38 compresses the water and, more importantly, any gases within the water, thereby decreasing the volume of the same. When the internal pressure of the pipe reaches a certain threshold force, the pressure opens the poppet valve 42 allowing the water to push through the apparatus 10 and out the apertures 30 within the base 28. However, this may cause a drop in pressure within the pipe immediately upstream of the apparatus 10, causing the poppet valve 42 to close again on the surface 44 of the cylinder portion 20, causing the pressure to build therein and compressing the water and gas again until, once again, the pressure builds to overcome the resistance of the spring 38 to open the poppet valve 42. This pressurization/depressurization occurs very frequently, causing the oscillation of the poppet valve 42 within the chamber 40 as the poppet valve rapidly opens and closes. Thus, water collectively is pressurized upstream from the apparatus 10, causing a decrease in the volume of gases contained therein, ultimately causing the water meter to read a truer and more accurate flow of water therethrough, minimizing the contribution of gases contained within the water.

Therefore, it is necessary that the spring 38 be strong enough to withstand the rapid oscillating movement of the poppet valve 42. In addition, the compressibility of the spring may be extremely important, as it is desirable to ensure that the spring 38 provides sufficient resistance against the flow of water therethrough to cause sufficient and significant pressurizing of the water upstream of the apparatus 10. However, the spring constant must also be sufficient to allow the poppet valve 42 to open when the pressure reaches a desired threshold to ensure that water flows therethrough. If the tension of the spring is too high, then the poppet valve 42 may not open effectively, restricting the flow of water therethrough and increasing pressure dangerously.

FIGS. 4-6 illustrate an alternate embodiment of the present invention of an apparatus 50. FIG. 4 illustrates an outer casing 52 of the apparatus 50 having a first end 54 and a second end 56 and a body portion 58 disposed between the first end 54 and second end 56. Disposed on the first end 54 may be a threaded portion that may engage threads of a pipe or another attachment for installing in-line with a pipe for allowing fluid, such as water, to flow therethrough. On the second end 56 may also be a threaded portion that may engage threads of a pipe or another attachment for installing in-line with a pipe for allowing fluid, such as water, to flow therethrough.

FIG. 5 illustrates a cross-sectional view along line V-V of FIG. 4. The cross-sectional view illustrates the internal components of the apparatus 50, including the shape of the internal surfaces of the casing 52, as detailed below, a poppet valve 60, and internal spring 62 that allows poppet valve 60 to oscillate when pressurized fluid flows therethrough.

Disposed at the second end 56 of the apparatus 50 may be a retaining ring 64 for holding a base 66 in place. The base may be substantially identical to the base 28 described above with reference to FIG. 3. The base may have a first retaining ring 68 on a first surface of the base and a second retaining ring 70 on the second surface thereof. The first and second retaining rings 68, 70 provide structural support for an aperture disposed in the base 66 for allowing a shaft 72 to be disposed and oscillate therethrough. The spring 62 may be disposed around the shaft 72, providing resistance for the movement of the shaft 72 and poppet valve 60 as pressurized fluid pushes against poppet valve 60.

To provide guidance for the spring 62, a first sleeve bearing or bushing 74 may be disposed against the second retaining ring 70, with the base of the bushing 74 contacting the retaining ring 70 and the shaft of the bushing 74 disposed internally within the spring 62, thereby providing guidance for the positioning of the spring 62. A second bushing 76 may be disposed against the poppet valve 60, with the base of the bushing 76 contacting the poppet valve 60 and the shaft of the bushing 76 disposed internally within the spring 62, further providing guidance for the positioning of the spring 62. The first and second bushings 74, 76 may work in concert to ensure that the spring maintain its position within the apparatus 50, so that the spring functions properly as the poppet valve oscillates rapidly during use. Without guidance of the spring 62 during use thereof, the spring may misalign, causing stress and/or damage to the spring 62 and other components of the apparatus 50. The shaft 72 may have a threaded end 78 that may be threaded within a receiving aperture within the poppet valve 60 to rigidly hold the shaft in place.

The apparatus 50 may further have a seat 80 that may engage the poppet valve 60 to seal the same when the poppet valve 60 is disposed adjacent to the same. The seat 80 may have a roughly frusto-conical shape to match a frusto-conical shape of the poppet valve 60. Thus, when the spring 62 has sufficient resistance to maintain the poppet valve 60 against the seat 80, the poppet valve 60 closes the apparatus 50 to the passage of fluid. However, when the pressure of the fluid overcomes the resistance of the spring 62, the poppet valve 60 moves toward the second end 56 of the apparatus 50, thereby opening the same to the passage of fluid, dropping the pressure of fluid against the poppet valve 60, causing it to close. This causes an oscillation of the poppet valve 60, rapidly opening and closing the apparatus 50 to the passage of fluid, regulating the pressure of the fluid, and decreasing volume of entrapped gas bubbles that may be contained therein.

FIG. 6 illustrates a front end view of first end 54 of the apparatus 56, showing the shape of the apparatus 50. Specifically, the body portion 58 may have a hexagonal shape to aid an installer in installing and removing the apparatus 50 by utilizing an installation or removal tool as apparent to one of ordinary skill in the art. In a preferred embodiment, the outer casing 52 of the apparatus is made of a rigid and resilient thermoplastic, but may be made of any material useful to serve the purposes defined herein. The poppet valve 60 and the bushings 74, 76 may also be a resilient thermoplastic, although other components, such as the spring 62, the shaft 72, the base 66 and the retaining ring 64 may be made of metal to provide the necessary strength for utilizing the apparatus 50 for its intended purpose.

Figure 7:
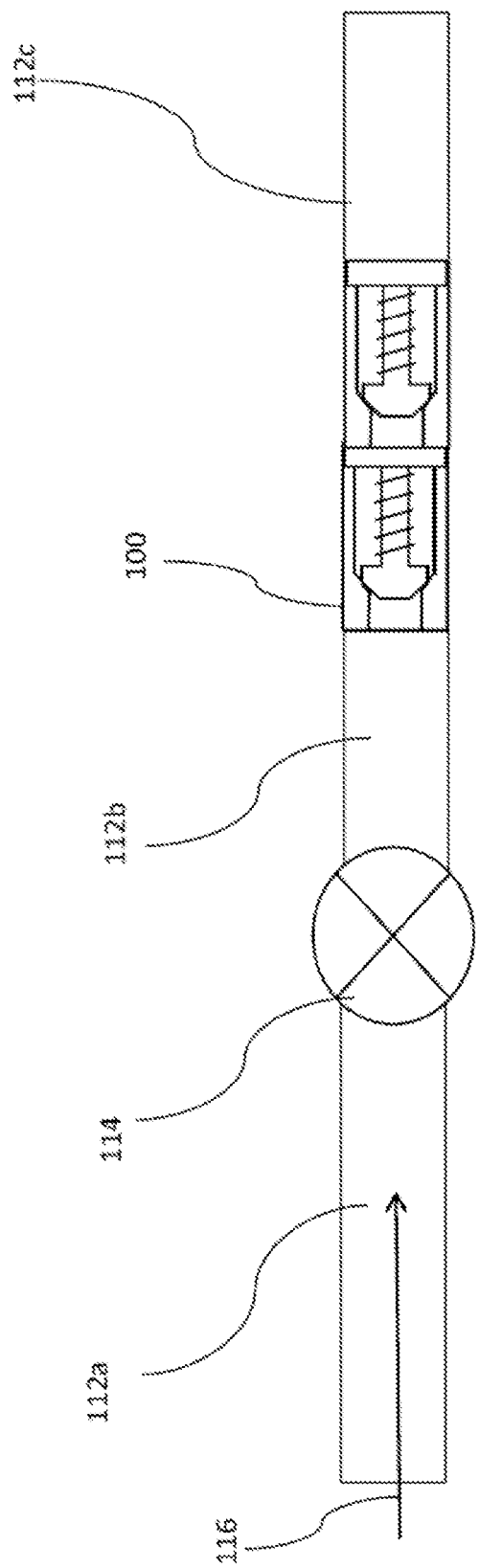
FIG. 7 illustrates a representative of a dual chamber apparatus of the present invention in-line within a pipe in position to affect the measured volume of water flowing through a water meter in an embodiment of the present invention.

In an alternate embodiment of the present invention, FIG. 7 illustrates a dual-chamber apparatus 100 that may be fit within pipes to provide the dual purpose of compressing the water, as provided for above (utilizing one chamber for the same) and providing backflow protection against water that may flow the opposite direction. Specifically, the water pipe (although it should be noted that the fluid may be any fluid apparent to one of ordinary skill in the art) may have a first pipe section 112a, connected to a water meter 114. The water meter 114 may further be connected to a second pipe section 112b and then to the dual-chamber apparatus 100. The dual chamber apparatus 100 may further be connected to a third water pipe section 112c, as illustrated in FIG. 7. The normal flow of fluid, such as water, through the system is illustrated by arrow 116.

Figure 8:
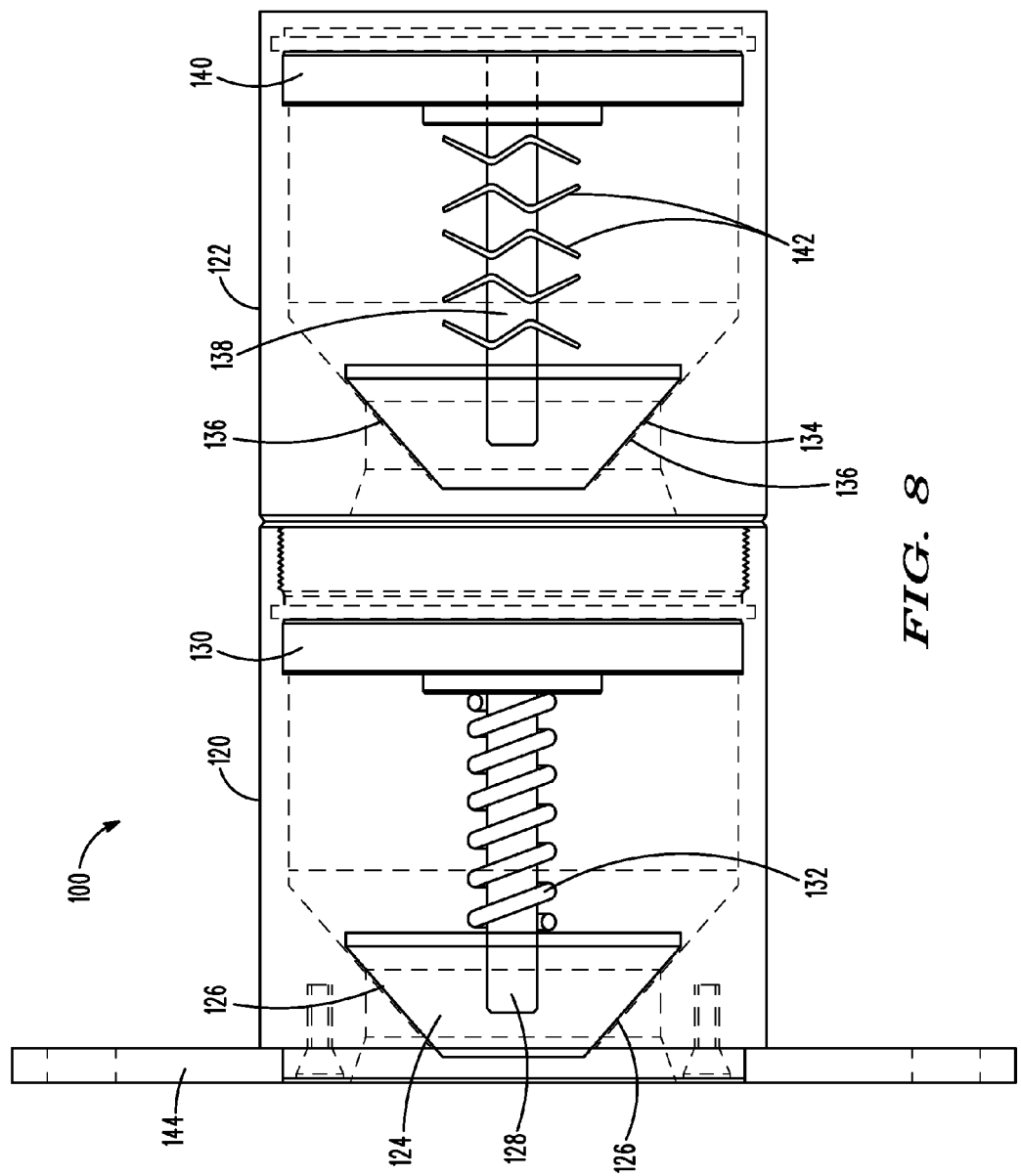
FIG. 8 illustrates a cross-sectional view of a dual chamber apparatus in an alternate embodiment of the present invention.

FIG. 8 illustrates a cross-section of the apparatus 100 in an embodiment of the present invention. Specifically, the apparatus 100 comprises a first chamber 120 and a second chamber 122. The first chamber 120 may further comprise a first poppet valve 124, shown in FIG. 8 as being generally wedge or funnel-shaped, although the first poppet valve 124 may be any shape apparent to one of ordinary skill in the art. The first poppet valve 124 may generally sit on a seat 126. Moreover, the first poppet valve 124 may be slidably mounted to a shaft 128 that may be disposed through a base 130. Disposed between the poppet valve 124 and the base 130, and surrounding the shaft 128 may be a spring 132. Thus, when water flows through the apparatus 100 from left to right (positive flow), the spring 132 may compress and the poppet valve 124 may lift from the seat 126, thereby allowing the flow of water therethrough.

The second chamber 122 may further comprise a second poppet valve 134, shown in FIG. 8 as being generally frusto-conically shaped, although the second poppet valve 134 may be any shape apparent to one of ordinary skill in the art. The second poppet valve 134 may generally sit on a seat 136. Moreover, the second poppet valve 134 may be slidably mounted to a shaft 138 that may be disposed through a base 140. Disposed between the poppet valve 134 and the base 140, and surrounding the shaft 138 may be a spring 142. Thus, when water flows through the apparatus 100 from left to right (positive flow), the spring 142 may compress and the poppet valve 134 may lift from the seat 136, thereby allowing the flow of water therethrough. The spring 142 may be positioned using guides and bushings, as described above with reference to the single chamber apparatus 10 and 50.

As shown in FIG. 8, the first spring 132 is shown as a coil spring and the second spring 142 is shown as a wave spring. It should be noted that a coil spring can be used for one or both of the first spring 132 and the second spring 142. Alternatively, a wave spring can be used for one or both of the first spring 132 and the second spring 142. Preferably, the first spring 132 is a coil spring and the second spring 142 is a wave spring, as shown in FIG. 8. Use of a wave spring may decrease the size of the apparatus 100 as the same or similar compression effect may occur with a wave spring on a smaller scale than with a coil spring. In addition, and without being bound by theory, the spring 132 as a coil spring and the spring 142 as a wave spring may offer increased control of the flow of water therethrough.

When the first chamber 120 and the second chamber 122 are disposed in series, as shown in FIG. 8, the effect may be a compression of the water due to back pressure caused by the push of the first poppet valve 124 and the second poppet valve 134 against the flow of water therethrough. The back pressure, thus, aids in decreasing the volume of air bubbles within the water by compressing the same, causing a more accurate measurement of the flow of water through the water meter 114 (as shown in FIG. 7).

The compressibility of the springs 132, 142 may affect the degree of compression on the water flowing therethrough. Thus, the compressibility of the springs may be determined and provided based on the amount of compression of the gas bubbles desired within the water. Specifically, the compressibility of the springs 132, 142, as well as the size (such as the length) of the apparatus 100, may be determined based on several factors, including the size of the pipe through which the water flows, the pressure of the water through the pipe as it enters a home or other building, and the pressure of the water as it pushes against the first poppet valve 124 and/or the second poppet valve 134. Without being bound by theory, the back pressure generated by the apparatus 100 may be dependent upon the oscillation of each of the poppet valves 124, 134 as water flows through the apparatus 100. Thus, each of the variables listed above may be utilized to determine the proper oscillation and, hence, the preferred back pressure generated by the apparatus 100.

In addition, as noted above, the apparatus 100 may serve the additional function of being a backflow preventer during periods of negative flow, such as if water flowed from right to left in FIGS. 7 and 8. If utilized as a backflow preventer, the negative flow of water may immediately cause the poppet valve 134 in the second chamber 122 (due to being closer to the "source" in a backflow condition) to close on the seat 136, preventing the flow of water in the opposite direction. Having the first chamber 120 may be a redundancy and may afford an extra level of protection in case the second chamber 122 failed to operate effectively as a backflow preventer.

Disposed on an end of the first chamber 120 may be a mounting plate 144 for mounting to a pipe. Moreover, it should be noted that the first chamber 120 and the second chamber 122 may be removably interconnected, such as through threads disposed on each of the chambers. Thus, the first chamber 120 and the second chamber 122 may be removable from each other, such as for repair or for other like reasons. In addition, if only backflow prevention is desired, then a single chamber may be utilized by removing one of the chambers to merely provide the closure of the poppet valve during periods of negative flow.

Figure 9:
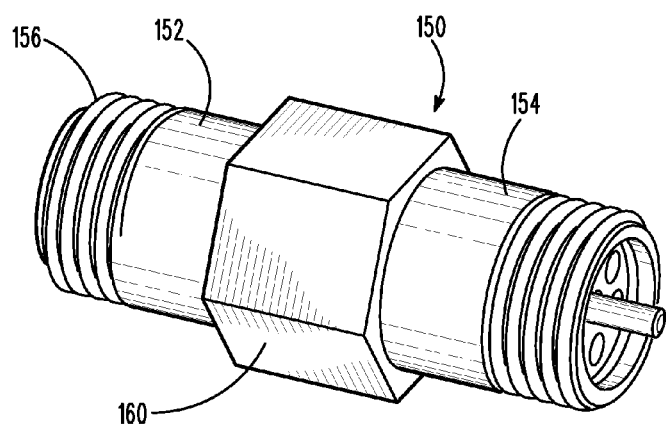
FIG. 9 illustrates a perspective view of a dual chamber apparatus yet another alternate embodiment of the present invention.
Figure 10:
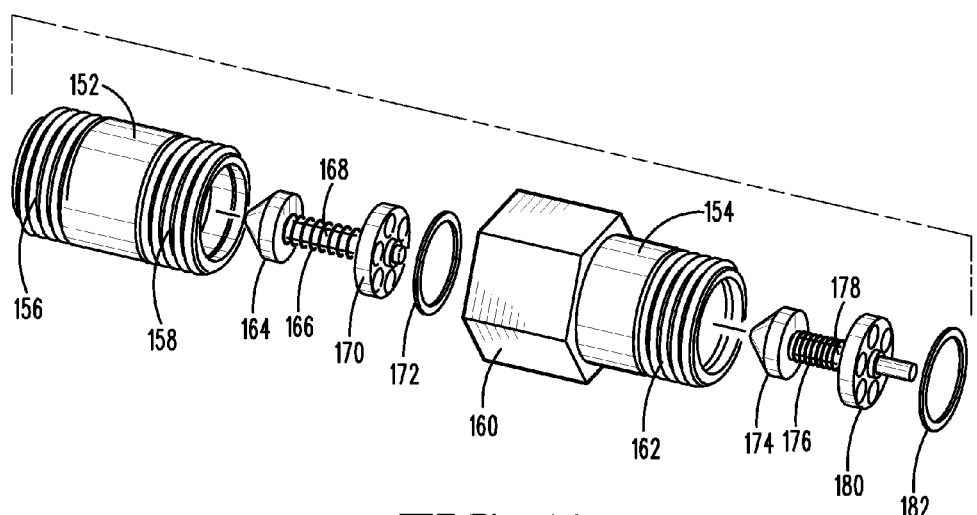
FIG. 10 illustrates an exploded view of the dual chamber apparatus in the alternate embodiment of the present invention.

FIGS. 9 and 10 illustrate a further embodiment of a dual chamber apparatus 150. The dual chamber apparatus 150 may comprise a first chamber 152 and a second chamber 154 disposed serially to each other. As illustrated in FIG. 10, an exploded view of the dual chamber apparatus 150, the first chamber may have a first end 156 and a second end 158 that are threaded. The second end 158 may be disposed within a threaded first end 160 of the second chamber 154, the first end 160 further having a hexagonal body shape to aid an installer in installing or removing the same. The second chamber 154 may have a second end 162 having a threaded portion for attaching to a pipe or another apparatus.

As shown in the exploded view of the dual chamber apparatus 150, illustrated in FIG. 10, the first chamber 152 may have the internal components described above with respect to the apparatus 100, such as a poppet valve 164, a shaft 166, a spring 168, a base 170 and a retaining ring 172 to hold the components within the apparatus 152. The spring 168 may be a standard coiled spring, but may be a wave spring, as described above. The second chamber 154 may further have the internal components described above, such as a poppet valve 1743, a shaft 176, a spring 178, a base 180 and a retaining ring 182 to hold the components within the apparatus 154. The spring 178 is illustrated as a wave spring, but may be a standard coiled spring. The springs 168, 178 may have retaining structures and guides to aid in keeping the springs in alignment when in use, as described above.

Figure 11:
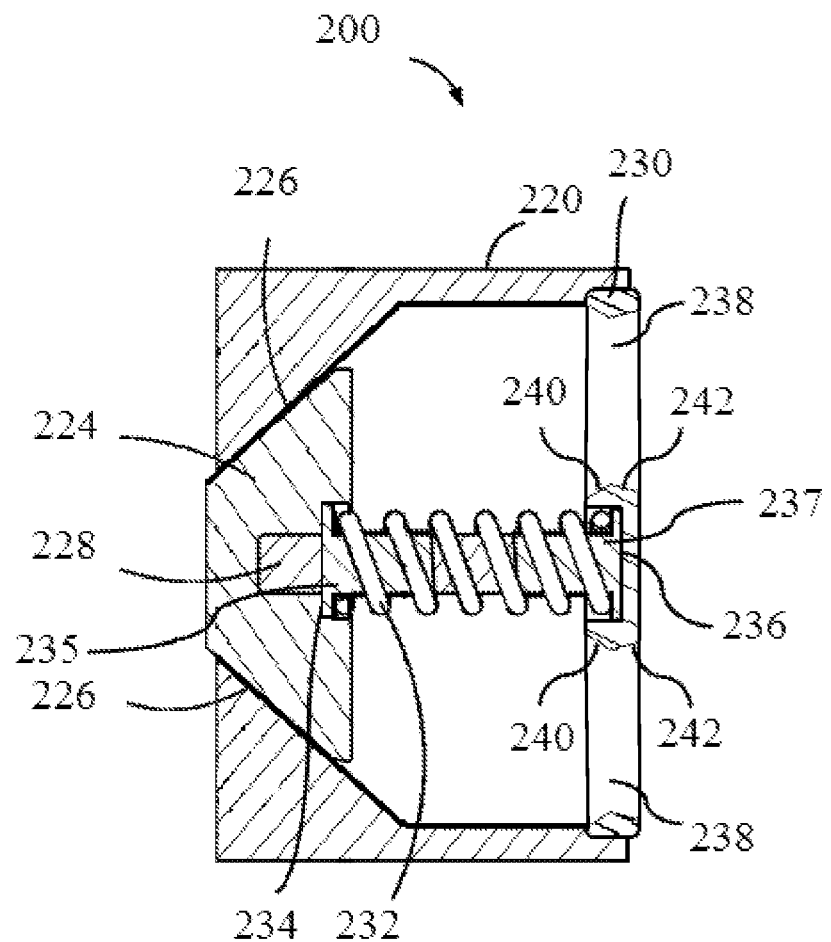
FIG. 11 illustrates a cross-sectional view of an apparatus in a preferred embodiment of the present invention.

FIG. 11 illustrates a cross-section of an apparatus 200 in a preferred embodiment of the present invention. Specifically, the apparatus 200 comprises a chamber 220 having a poppet valve 224, shown as being generally wedge or funnel-shaped, although the poppet valve 224 may be any shape apparent to one of ordinary skill in the art. The poppet valve 224 may generally sit on a seat 226. Moreover, the poppet valve 224 may be slidably mounted to a shaft 228 that may be disposed through a base 230. Disposed between the poppet valve 224 and the base 230, and surrounding the shaft 228 may be a spring 232. The spring 232 is shown as a coil spring in FIG. 11, but it may be any resistance providing device such as a wave spring, a flat spring, a rubber band, a machined spring, a cantilever spring, a leaf spring, a v-spring, torsion spring, or other resistance device known to one skilled in the art. When water flows through the apparatus 200 from left to right (positive flow), the spring 232 may compress and the poppet valve 224 may lift from the seat 226, thereby allowing the flow of water therethrough.

Specifically, as shown in FIG. 11, the spring 232 may be disposed within a first depression 234 within a back side of the poppet valve 224. The first depression 234 within the poppet valve 224 may be large enough to hold at least one coil of the spring 232. However, the first depression 234 may be larger and hold a plurality of the coils of the spring 232. The first depression 234 may be cylindrical to surround and support the spring 232 and may help guide the spring 232 along the shaft 228 or otherwise hold the spring 232 in place when the spring 232 compresses. Additionally, the first depression 234 may prevent the spring 232 from improperly bending or shifting while the spring 232 compresses along the shaft 228. The spring 232 may be disposed adjacent a back of the first portion 234, wherein the spring 232 may be pressed against the back of the first depression 234 when the spring 232 compresses.

Optionally, a first sleeve 235 may also be disposed within the first depression 234 having a base and a cylindrical portion, the base of which rests within the first depression 234 and the cylindrical portion of which is disposed around the shaft 228. The cylindrical portion of the first sleeve 235 may sit between the spring 232 and the shaft 228, thereby preventing the spring 232 from contacting the shaft 228, keeping the spring 232 in alignment while in use. Preferably, the first sleeve 235 may be made of plastic although the first sleeve 235 should not be limited as described herein.

Similarly, the spring 232 may be disposed within a second depression 236 disposed within the base 230. The second depression 236 may be within the base 230 and may be large enough to hold at least one coil of the spring 232. However, the second depression 236 may be larger and hold a plurality of the coils of the spring 232. The second depression 236 may be cylindrical to surround and support the spring 232 and may help maintain the spring 232 around the shaft 228 when the spring 232 compresses. Additionally, the second depression 236 may prevent the spring 232 from improperly bending or shifting while the spring 232 compresses along the shaft 228. The spring 232 may be disposed adjacent a back of the second depression 236, wherein the spring 232 may be pressed against the back of the second depression 236 when the spring 232 compresses.

Optionally, a second sleeve 237 may also be disposed within the second depression 236 having a base and a cylindrical portion, the base of which rests within the second depression 236 and the cylindrical portion of which is disposed around the shaft 228. The cylindrical portion of the sleeve 235 may sit between the spring 232 and the shaft 228, thereby preventing the spring 232 from contacting the shaft 228, keeping the spring 232 in alignment while in use. Preferably, the first sleeve 235 may be made of plastic although the first sleeve 235 should not be limited as described herein.

The first depression 234 and the second depression 236 may be an alternative to or used in addition to the spring guide rings, bushings, and/or retaining rings discussed above. Preferably, the first portion 234 and the second portion 236 may be used with all apparatuses discussed herein so as to use less parts and create more compact apparatuses.

Figure 12:
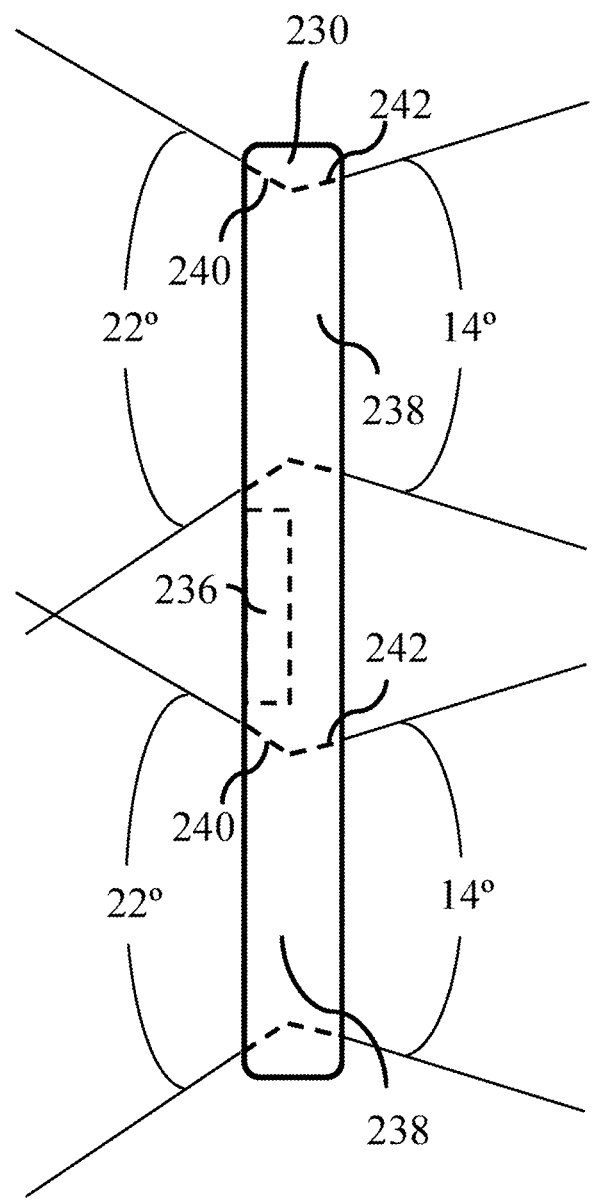
FIG. 12 illustrates a side view of a base of the apparatus in a preferred embodiment of the present invention.

Additionally shown in FIG. 11, and more closely in FIG. 12, are a plurality of apertures 238. The plurality of apertures 238 may allow fluid, such as water, to flow therethrough. Preferably, as seen in FIGS. 2, 9, and 10, there may be six apertures 238 arranged circularly within the base 230. Of course, any number of apertures 238 may be disposed with the base 230 such that fluid may flow therethrough. As a result of fluid flowing through the plurality of apertures 238, turbulence may be created as the fluid adjusts from one volume to another, specifically between the volume of the chamber 220 and the plurality of the apertures 238. As a result of this turbulence, the flow of the fluid through the base 230 may be negatively impacted.

The plurality of apertures 238 may be tapered accordingly to control the flow of fluid through the base 230. Specifically, the plurality of apertures 238 may each have a funneled inlet 240 and a funneled outlet 242. Specifically, as shown in FIG. 12, the funneled inlet 240 preferably may be angled at 22 degrees or 11 degrees from the horizontal. The funneled outlet 242 preferably may be angled at 14 degrees or 7 degrees from the horizontal. Of course, other angles may be used without departing from the scope of the present invention.

The funneled inlet 240 may draw fluid inwardly and increase the speed of the fluid as the volume is constricted. The funneled outlet 242 may expel fluid outwardly and decrease the speed of the fluid as the volume expands. The change in the speed and volume of the fluid through the funneled inlet 240 and funneled outlet 242 may create a Venturi effect, wherein fluid pressure may be reduced through the plurality of apertures 238 in the base 230. Funneling the inlet and outlet may reduce the amount of turbulence the fluid would experience when flowing through the plurality of apertures 238.

It should be noted that the embodiments described herein with respect to FIGS. 11 and 12 may be configured in a dual valve system, wherein a first apparatus, as described above with respect to FIG. 11, may be connected to a second apparatus described above with respect to FIG. 11, may be attached, connected, or otherwise disposed together serially, as shown in FIGS. 8-10, above. Such a dual valve system may realize the same advantages as described above with respect to FIGS. 8-10, and the additional advantages described with respect to FIGS. 11 and 12.

It should further be noted that various changes and modifications to the presently preferred embodiments described herein will be apparent to those skilled in the art. Such changes and modifications may be made without departing from the spirit and scope of the present invention and without diminishing its attendant advantages.

We claim:

1. An apparatus for managing the flow of fluid through a pipe comprising:
   a housing forming an internal chamber having an inlet opening and an outlet opening wherein pressurized fluid flows through the housing;
   a poppet valve mounted to a shaft and disposed within the internal chamber, the poppet valve configured to contact a seat in proximity to the inlet opening wherein the poppet valve contacting the seat prevents the flow of fluid through the housing and into the chamber from the inlet opening;
   a base plate spanning a cross-section of the housing in proximity to the outlet opening, the base plate having a central opening slidably receiving the shaft, an internal surface, and at least one aperture within the base plate for allowing the flow of fluid through the outlet opening,
   wherein the aperture has an inlet side into which the fluid flows and an outlet side out of which the fluid flows as the fluid flows therethrough, wherein the inlet side has a conical taper from the inlet side of the aperture to a midpoint between the inlet side and the outlet side wherein the size of the aperture at the inlet side is larger than the size of the aperture at the midpoint, and further wherein the outlet side has a conical taper from the midpoint to the outlet side of the aperture wherein the size of the aperture at the midpoint is smaller than the size of the aperture at the outlet side; and
   a spring around the shaft having a first end and a second end, the first end of the spring disposed within a first depression in the poppet valve and the second end of the spring disposed within a second depression in the internal surface of the base, wherein movement of the poppet valve toward the base causes a compression of the spring.

2. The apparatus of claim 1 wherein the conical taper from the inlet side to the midpoint is angled at 22 degrees and the conical taper from the midpoint to the outlet side of the aperture is angled at 14 degrees.

3. The apparatus of claim 1 wherein the first depression in the poppet valve and the second depression in the base hold the spring in alignment around the shaft.

4. The apparatus of claim 1 further comprising:
   a sleeve disposed between the spring and the shaft to guide the spring and prevent the spring from contacting the shaft.

5. The apparatus of claim 1 wherein the shaft is rigidly disposed within the poppet valve.

6. The apparatus of claim 4 wherein the shaft has a threaded end, wherein the threaded end is disposed within the poppet valve without traversing the entirety of the poppet valve.

7. The apparatus of claim 1 further comprising:
   a mounting plate disposed on a first end of the housing in proximity to the inlet opening for mounting the apparatus within a pipe.

8. An apparatus for controlling the flow of fluid therethrough, the apparatus comprising:
   a housing forming an internal chamber having an inlet opening and an outlet opening wherein pressurized fluid flows through the housing;
   a poppet valve mounted to a shaft and disposed within the internal chamber, the poppet valve configured to contact a seat in proximity to the inlet opening wherein the poppet valve contacting the seat prevents the flow of fluid through the housing and into the chamber from the inlet opening;
   a base plate spanning a cross-section of the housing in proximity to the outlet opening, the base plate having a central opening slidably receiving the shaft, an internal surface, and at least one aperture within the base plate for allowing the flow of fluid through the outlet opening,
   wherein the at least one aperture has an inlet side into which fluid flows and an outlet side out of which fluid flows as fluid flows therethrough, wherein the inlet side has a conical taper from the inlet side of the aperture to a midpoint between the inlet side and the outlet side wherein the size of the aperture at the inlet side is larger than the size of the aperture at the midpoint, and further wherein the outlet side has a conical taper from the midpoint to the outlet side of the aperture wherein the size of the aperture at the midpoint is smaller than the size of the aperture at the outlet side; and
   a spring around the shaft having a first end and a second end, wherein movement of the poppet valve toward the base causes a compression of the spring.

9. The apparatus of claim 8 wherein the conical taper from the inlet side to the midpoint is angled at 22 degrees and the conical taper from the midpoint to the outlet side of the aperture is angled at 14 degrees.

10. The apparatus of claim 8 further comprising a first depression disposed within the base and surrounding the central opening.

11. The apparatus of claim 8 further comprising:
    a sleeve disposed between the spring and the shaft to guide the spring and prevent the spring from contacting the shaft.

* * * * *